United States Patent [19]
Viot et al.

[11] Patent Number: 5,684,928
[45] Date of Patent: Nov. 4, 1997

[54] CIRCUIT AND METHOD FOR EVALUATING FUZZY LOGIC RULES

[75] Inventors: J. Greg Viot, Austin; James M. Sibigtroth, Round Rock, both of Tex.

[73] Assignee: Motorola, Inc., Schaumburg, Ill.

[21] Appl. No.: 570,454

[22] Filed: Dec. 11, 1995

[51] Int. Cl.⁶ .................................................. G06F 15/18
[52] U.S. Cl. .............................. 395/3; 395/61; 395/900
[58] Field of Search .................... 395/3, 900, 61–62, 395/50, 10

[56] References Cited

U.S. PATENT DOCUMENTS

| | | | |
|---|---|---|---|
| 5,371,832 | 12/1994 | Eichfeld et al. | 395/3 |
| 5,561,738 | 10/1996 | Kinerk et al. | 395/3 |

FOREIGN PATENT DOCUMENTS

| | | | |
|---|---|---|---|
| 42 25 758 A1 | 2/1994 | Germany | G06F 15/20 |

OTHER PUBLICATIONS

Genther et al, "Rule weight generation for a fuzzy classification system based on fuzzy clustering methods"; Proceedings of the third IEEE Conference on Fuzzy systems, p. 614–617 vol. 1, Jun. 1994.

Goodridge et al, "Multilayered fuzzy behavior fusion for real-time reactive control of systems with multiple sensors"; IEEE Transactions on industrial engineering, vol. 43, No. 3, pp. 387–394, Jun. 1996.

Yeung et al, "A weighted fuzzy production rule evaluation method"; Proceedings of 1995 IEEE international conference on fuzzy systems, pp. 461–468 vol. 2, Mar. 1995.

*Primary Examiner*—Tariq R. Hafiz

[57] ABSTRACT

In a data processing system (10) implementing a fuzzy logic operation, a switching mechanism (802) is implemented to provide a selection between a variable format rule base (803) and a fixed format rule base. The variable format rule base utilizes buffers between fuzzy input addresses and fuzzy output addresses, while the fixed format rule base does not require such buffers since a number of fuzzy input addresses and fuzzy output addresses is predetermined.

15 Claims, 7 Drawing Sheets

CIRCUIT AND METHOD FOR EVALUATING FUZZY LOGIC RULES

CROSS-REFERENCE TO RELATED APPLICATIONS

This Application is related to co-pending patent application entitled:

DATA PROCESSING SYSTEM FOR EVALUATING FUZZY LOGIC RULES AND METHOD THEREFOR, Ser. No. 08/363,434, Attorney Docket Number SC-02395A, by J. Greg Viot and filed on Dec. 22, 1994;

U. S. Pat. No. 5,295,229; and

U. S. Pat. No. 5,263,125, each of which are hereby incorporated by reference herein.

TECHNICAL FIELD

This invention relates generally to a data processing system, and more particularly to execution of a fuzzy logic operation in a data processing system.

BACKGROUND INFORMATION

Data processors have been developed to function as binary machines whose inputs and outputs are interpreted as ones or zeroes, and no other possibilities may exist. While this works well in most situations, sometimes an answer is not simply "yes" or "no," but somewhere in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "a temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, if a range of temperatures provide the membership functions, an input temperature may fall in the overlapping areas of both the functions labeled "cool" and "warm." Further processing would then be required to determine a degree of membership in each of the membership functions (i.e. the degree to which the current temperature fits into each of the membership sets cool and warm).

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception.

After the fuzzification step, a step referred to as rule evaluation is executed. During the rule evaluation step, rule expressions that depend on fuzzy input values are evaluated to derive fuzzy outputs. For example, assume a rule to be evaluated may be stated as:

If (Temperature is warm) and (Pressure is high), then (Fan speed is medium).

In this rule, two antecedents, "Temperature is warm" and "Pressure is high" must be evaluated to determine a rule strength of the consequence, "Fan speed is medium." During the rule evaluation step, the degree to which an antecedent is true affects the degree to which the rule is true. The minimum of the antecedents is applied as the rule strength of the consequence of the rule. Additionally, when more than one rule is to be evaluated, a possibility exists for an action to be assigned more than one rule strength. In such a situation, the rule strength with a greater value should be assigned to the action. Therefore, the action is assigned a rule strength of greatest value.

The last step in the fuzzy logic process is referred to as "defuzzification." This step resolves competing results of the rule evaluation step into a single action. Defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth, which is hereby incorporated by reference herein. The article was published in the April 1992 issue of AI EXPERT on pages 25 through 31.

In summary, rules are made up of a series of premises (antecedents) followed by one or more actions (consequences). Each antecedent corresponds to a fuzzy input and each action corresponds to a fuzzy output. In a hardware implementation of the rule evaluation step, dedicated connections and circuits are used to relate fuzzy inputs to fuzzy outputs. This approach often requires dedicated memory circuitry and is inflexible. In a software implementation of the rule evaluation step, a program of instructions is used to evaluate rules. The software approach is typically slower than the hardware approach and requires a significant amount of program memory. In an industry where data must be computed, moved, and manipulated as quickly as possible, fast execution times are essential. Therefore, software is not a viable solution for some applications.

Therefore, a need exists for a circuit or method for performing the rule evaluation step quickly, but without extensive hardware requirements. The speed typically associated with a hardware solution is needed without the dedicated circuit area usually associated with such a solution.

Cross-referenced U.S. Pat. No. 5,263,125, which is hereby incorporated by reference herein, describes the use of a fuzzy rule base having a variable format, which allows rules to have any number of inputs and outputs. This variable format rule base contains overhead buffering to delineate the rules. In contrast, in a fixed format rule base, each rule has the same predetermined number of inputs and outputs, allowing the rules to be evaluated without overhead buffering. As a result, a fixed format rule base requires less memory to specify and less time to execute. The drawback to fixing the rule base format is that each rule must conform to a predetermined structure. Thus, there are advantages and disadvantages to both rule base formats and, thus, there are situations where one is desired over the other.

As a result of the foregoing, there exists a need for a circuit and method for providing the option of implementing a fixed or variable format rule base within a fuzzy logic system.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
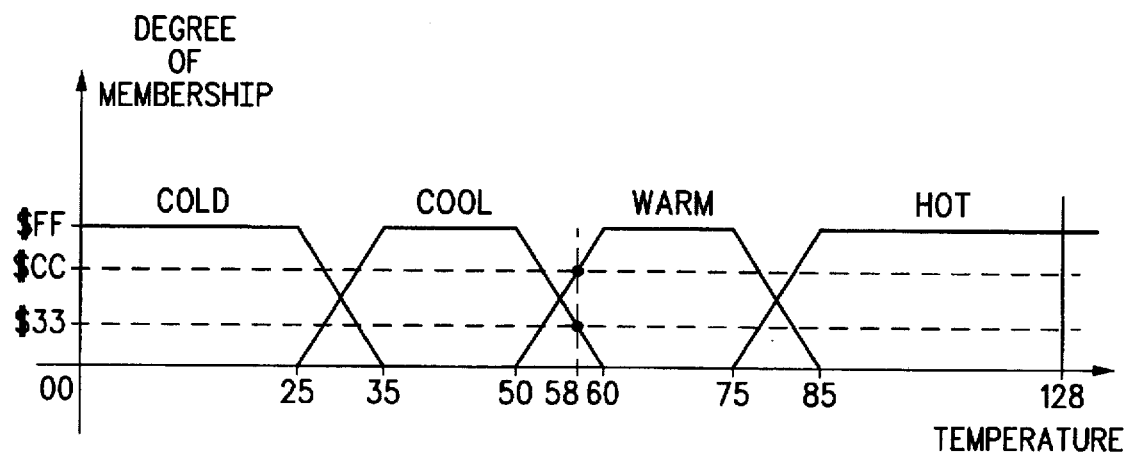
FIG. 1 illustrates in graph diagram form some general concepts and basic terminology used to describe fuzzy logic.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention provides a circuit and a method for executing a rule evaluation step in a fuzzy logic operation in a data processing system quickly and with a minimum amount of circuitry. The rule evaluation step is encoded in a single instruction which is efficiently executed without an excessive amount of added circuitry in the data processing system. Therefore, the present invention provides an instruction which allows the user of the data processing system to perform the rule evaluation step quickly without lengthy and time consuming software programs.

The instruction of the present invention, which is referred to with the mnemonic label "REV," causes the data processing system to perform a series of steps involving the retrieval of operands from memory and the performance of arithmetic operations using those operands. If the membership function values for antecedents of the rule to be evaluated and the consequences of that rule have been appropriately stored in memory prior to execution of the REV instruction of the present invention, the execution of the REV instruction results in proper evaluation of the rule. By assuming that the antecedents and consequences are stored in memory in a particular format, and by thoughtfully using existing hardware where possible in the execution of the instruction, the present invention permits the efficient evaluation of fuzzy logic rules in a general purpose data processing system with very little additional hardware. For instance, the overflow, or V bit, of a condition code register used in the course of performing signed arithmetic in the data processor, is used in the present invention as a flag in connection with the processing of operands from memory.

During a description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, a hexadecimal value may be indicated by a "$" symbol preceding a value.

FIG. 1 provides a graph illustrating a few basic terms and concepts of fuzzy logic. In the fuzzy logic system described in FIG. 1, a "system input" is temperature in degrees Fahrenheit. Four "membership functions" are provided to give labels to a range of temperatures. For example, from 0 degrees to 35 degrees, a temperature is labeled "cold." Similarly, from 25 degrees to 60 degrees, the temperature is labeled "cool." Notice that the boundaries of each of the membership sets overlaps the boundaries of the adjacent sets. Therefore, a temperature may be in more than one membership set. For example, assume that the system input indicates a temperature of 58 degrees. Referring to FIG. 1, notice that 58 degrees is within the boundaries of both the cool and warm membership sets. However, a degree of membership in each of the membership sets may be obtained. The system input has a degree of membership having a hexadecimal value of $33 for the cool membership set and a degree of membership having a hexadecimal value of $CC for the warm membership set. If the system input had indicated a temperature of 70 degrees, the temperature would have had a degree of membership with a hexadecimal value of $FF in the warm membership set. Likewise, the temperature of 70 degrees would have a degree of membership having a hexadecimal value of $00 in the hot membership set. In the fuzzy logic system described in FIG. 1, a degree of membership may range from a hexadecimal value of $00 to $FF, which corresponds to a fraction from 0.00 to 0.996. Those skilled in the art will recognize that a two place hexadecimal value may be represented by a single eight bit binary byte.

Figure 2:
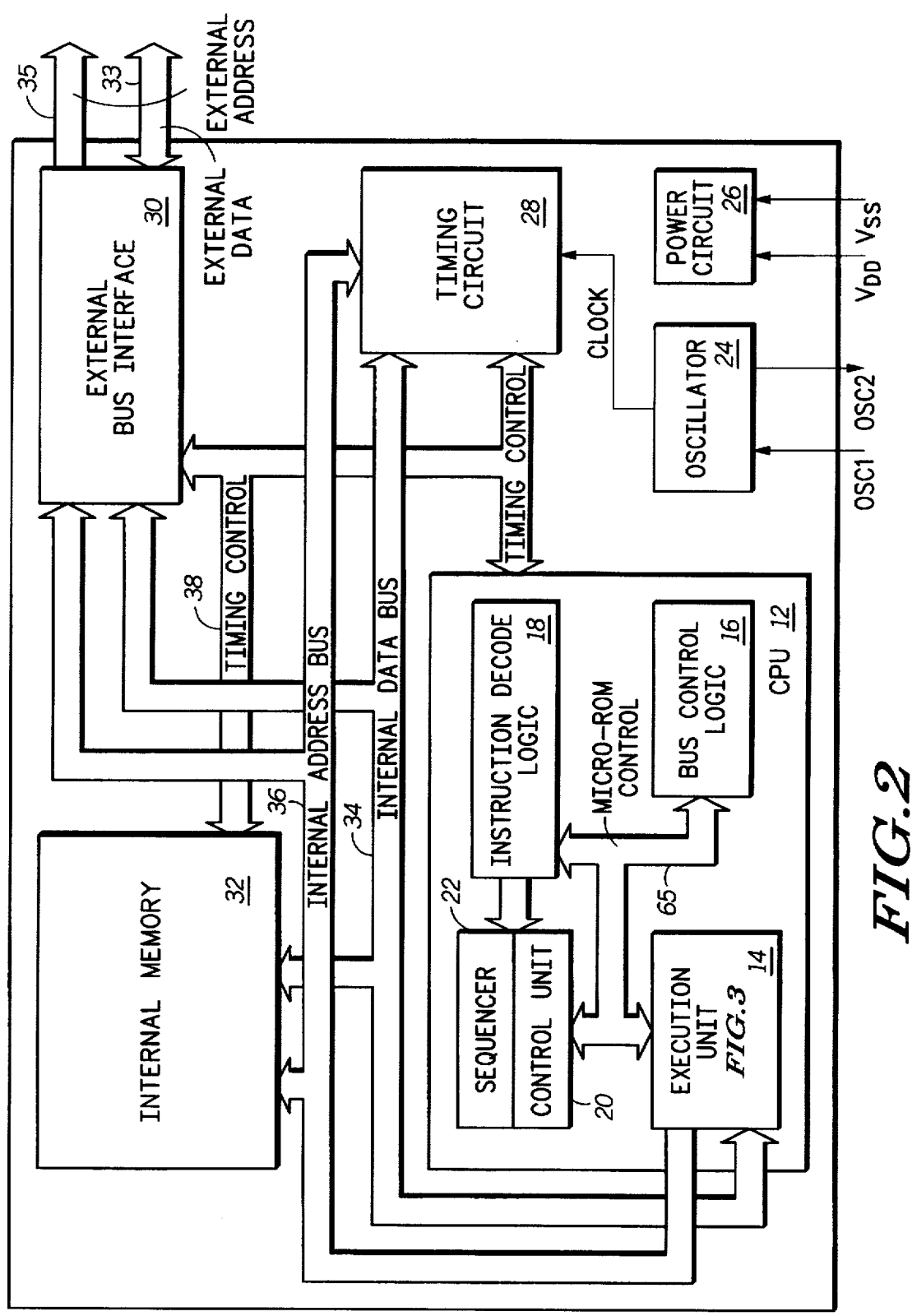
FIG. 2 illustrates in block diagram form a data processing system in accordance with the present invention.

One implementation of the instruction and method of operation described above is implemented in a modified form of a MC68HC11 micro controller. The MC68HC11 is an eight bit micro controller which includes sixteen bit addresses and storage registers and is available from Motorola, Inc. of Austin, Tex. This implementation is illustrated in greater detail in FIG. 2. FIG. 2 depicts a data processing system 10 in which the rule evaluation instruction may be implemented. Data processing system 10 generally includes a central processing unit (CPU) 12, an oscillator 24, a power circuit 26, a timing circuit 28, an external bus interface 30, and an internal memory 32. CPU 12 generally has an execution unit 14, a bus control logic circuit 16, an instruction decode logic circuit 18, a control unit 20, and a sequencer 22.

During operation, an "Osc 1" signal is provided to oscillator 24 via an external source, such as a crystal. The crystal is connected between the Osc 1 and Osc 2 signals to enable the crystal to oscillate. The Osc 1 provides a "Clock" signal to a remaining portion of data processing system 10. Operation of a crystal oscillator is well known in the data processing art and should be apparent to one with ordinary skill in the art.

Power circuit 26 receives both a "Vdd" and a "Vss" signal from an external power source. The Vdd signal provides a positive 5 volts and the Vss signal provides a reference, or ground voltage. The Vdd and Vss signals are provided to each of the remaining components of data processing system 10. The routing of these signals is well known in data processing art and will be apparent to one with ordinary skill in the art.

Timing circuit 28 receives the Clock signal and subsequently provides appropriate timing signals to each of CPU 12, external bus interface 30, and internal memory 32 via a Timing Control bus 38.

A plurality of address values are provided from external bus interface 30 to an External Address bus 35. Similarly, a plurality of data values are communicated by external bus interface 30 via an External Data bus 33. External bus interface 30 controls receipt and transmission of address and data values between an external user and data processing system 10. External bus interface 30 communicates a plurality of address and data values to a remaining portion of data processing system 10 via an Internal Address bus 36 and an Internal Data bus 34, respectively.

Internal memory 32 functions to store information necessary for the proper operation of data processing system 10. Additionally, other data values may be stored therein if specified in a user program provided via Internal Address bus 36 and Internal Data bus 34.

CPU 12 executes each of the instructions required during operation of data processing system 10. Internal Address bus 36 and Internal Data bus 34 communicate information between execution unit 14 and a remaining portion of data processing system 10. Bus control logic circuit 16 fetches instructions and operands. Each of the instructions is then decoded by instruction decode logic circuit 18 and provided to control unit 20 and sequencer 22. Control unit 20 and sequencer 22 maintain a sequence of execution of each of the instructions to most efficiently utilize the computing capabilities of data processing system 10. Additionally, control unit 20 includes a Micro-ROM memory (not shown) which provides a plurality of control information to each of execution unit 14, bus control logic 16, and instruction decode logic 18 via a Micro-ROM Control Bus 65. The plurality of control information is necessary for proper execution of the REV instruction.

Figure 3:
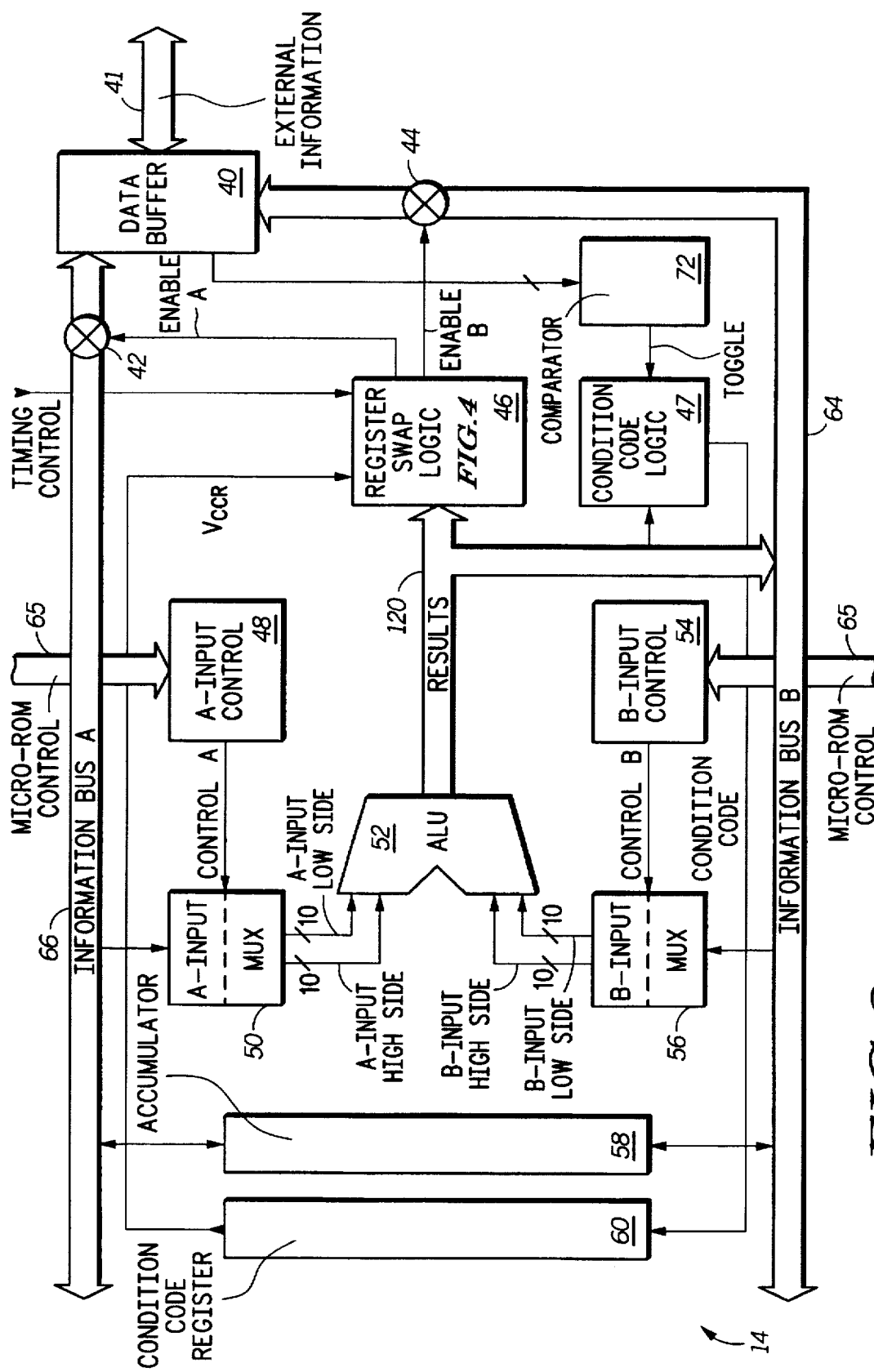
FIG. 3 illustrates in block diagram form an execution unit of FIG. 2.

Execution unit 14 is illustrated in greater detail in FIG. 3. Execution unit 14 generally includes a data buffer 40, a first selector 42, a second selector 44, a register swap logic circuit 46, a condition code logic circuit 47, an A-input control circuit 48, an A-input multiplexor 50, an arithmetic logic unit (ALU) 52, a B-input control circuit 54, a B-input multiplexor 56, an accumulator 58, a condition code register 60, and a comparator 72. In addition to accumulator 58 and condition code register 60, other storage registers may be implemented in execution unit 14. For example, an index register or a second accumulator may also be included. Implementation and use of such storage registers is well known in the art and will be apparent to one with ordinary skill in the art.

An External Information bus 41 provides address and data information to data buffer 40. External Information bus 41 receives the address and data information from Internal Address bus 36 and Internal Data bus 34, respectively. Data buffer 40 provides the values transferred via External Information bus 40 to remaining portions of execution unit 14 via an Information Bus A 66 and an Information Bus B 64 when selectors 42 and 44 are respectively enabled to allow information to be transferred. Although not shown in detail here, both Information Bus A 66 and Information Bus B 64 are sixteen bits wide and are divided into a high side (bit 15 through bit 8) and a low side (bit 7 through bit 0). Additionally, data buffer 40 provides address information to comparator 72.

A first and a second input of accumulator 58 are bidirectionally coupled to Information Bus A 66 and Information Bus B 64, respectively. Any additional registers such as accumulators and index registers would be similarly coupled to Information Bus A 66 and Information Bus B 64.

A plurality of control signals are provided to both A-input control logic 48 and B-input control logic 54 via the Micro-ROM Control bus 65. Micro-ROM Control bus 65 provides the plurality of control signals in response to information provided by a Micro-ROM memory (not shown) in control unit 20.

A-input control 48 provides a "Control A" signal to a control input of A-input multiplexor 50. Information Bus A 66 is connected to a data input of A-input multiplexor 50. A-input multiplexor 50 provides both a first ten bit output labeled "A-Input Low Side" to a first input of ALU 56 and a second ten bit output labeled "A-Input High Side" to a second input of ALU 56. B-Input control 54 provides a "Control B" signal to a control input of B-input multiplexor 56. Information Bus B 64 is connected to a data input of B-input multiplexor 56. B-input multiplexor 56 provides both a first ten bit output labeled "B-Input Low Side" to a third input of ALU 56 and a second ten bit output labeled "B-Input High Side" to a fourth input of ALU 56.

ALU 52 processes each of the inputs to provide a plurality of results which are transferred via a Results bus 120. Results bus 120 provides the results provided by ALU 52 to register swap logic 46 and condition code logic 47. Additionally, Results bus 120 provides the plurality of results to Information Bus B 64.

Condition code logic 47 is also coupled to comparator 72 to receive a Toggle signal. Condition code logic 47 is coupled to condition code register 60 to provide a "Condition Code" signal.

Condition code register 60 provides a $V_{CCR}$ signal to a second control input of register swap logic 46. Additionally, a Timing Control signal is provided to a first control input of register swap logic 46. The Timing Control signal is provided via Timing Control Bus 38. Register swap logic 46 provides a first and a second output, respectively labeled "Enable A" and "Enable B." The Enable A signal is provided to a first control input of selector 42. Information Bus A 66 is bidirectionally coupled to selector 42. An output of selector 42 is coupled to data buffer 40 to communicate a plurality of selected signals. Similarly, the Enable B signal is provided to a first input of selector 44. Information Bus B 64 is bidirectionally coupled to selector 44. An output of selector 44 is coupled to data buffer 40 to communicate a second plurality of selected signals.

Figure 4:
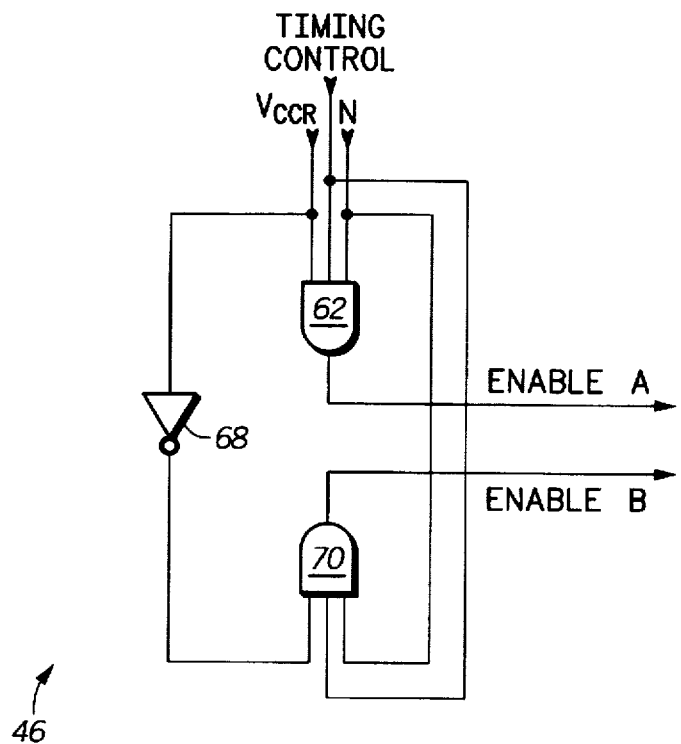
FIG. 4 illustrates in logic circuit form a register swap logic circuit of FIG. 3.

Register swap logic 46 is illustrated in greater detail in FIG. 4. Generally, register swap logic 46 includes an AND gate 62, an AND gate 70, and an inverter 68. The $V_{CCR}$ signal provides a first input to AND gate 62 and an input to inverter 68. An output of inverter 68 provides a first input to AND gate 70. The Timing Control signal provides a second input to both AND gate 62 and AND gate 70. Results bus 120 provides a signal labeled "N" from ALU 52 to a third input of both AND gate 62 and AND gate 70. An output of AND gate 62 provides the Enable A signal and the output of AND gate 70 provides the Enable B signal.

During execution of a fuzzy logic operation, a user of data processing system 10 may use an instruction with the mnemonic REV (Rule EValuation) to perform the rule evaluation step on fuzzy inputs. As was previously stated, fuzzy inputs are provided as a result of a fuzzification step in which a system input signal is assigned a degree of membership to each of a plurality of defined membership sets. In the implementation of the invention described herein, each of the degrees of membership assigned to a fuzzy input is stored in a predetermined memory location in the internal memory 32 of data processing system 10 prior to execution of the REV instruction. Assignation of each of the degrees of membership to a plurality of fuzzy inputs is disclosed in more detail in the cross-referenced co-pending patent application, Ser. No. 07/899,975, entitled, "A Circuit And Method For Determining Membership In A Set During A Fuzzy Logic Operation," by J. Greg Viot, James M. Sibigtroth, and James L. Broseghini.

Assume, in the example described herein, that two groups of membership sets are used during fuzzification of a first and a second system input. A first one of the two groups provides temperature measurements which are separated into membership sets of cold, cool, warm, and hot. When fuzzified, a degree of membership of the first system input in the cool membership set is referred to using a variable labeled $T_{cool}$. Similarly, a degree of membership of the first system input in each of the cold, warm, and hot membership sets is referred to a respective one of the linguistic variables $T_{cold}$, $T_{warm}$, and $T_{hot}$.

A second one of the two groups provides pressure measurements which are separated into membership sets of light, medium, and heavy. When fuzzified, a degree of membership of the second system input in the light, medium, and heavy membership sets is referred to using one of the linguistic variables respectively labeled $P_{light}$, $P_{medium}$, and $P_{heavy}$. After the system inputs have been fuzzified, the degree of membership of the first and second system inputs in each of the respective membership sets is stored in a predetermined location in memory. Additionally, rules must be evaluated to provide appropriate actions. Assume in this example that three rules which are to be evaluated have the following forms:

(1) Rule 1: If temperature is cool ($T_{cool}$) and pressure is light ($P_{light}$), then (Action 1) and (Action 2);

(2) Rule 2: If temperature is warm ($T_{warm}$) and pressure is medium ($P_{medium}$), then (Action 3); and (3) Rule 3: If pressure is medium ($P_{medium}$), then (Action 3).

Note that each of the rules has a form which typically has the form:

(4) If (Fuzzy Input 1) and (Fuzzy Input 2), then (Action X) and (Action Y).

During rule evaluation, the "if" portion of the rule is evaluated first to determine a minimum degree of membership value. The "if" portion of the rule includes both the Fuzzy Input 1 value and the Fuzzy Input 2 value. A common method to determine rule strength is to determine a minimum degree of membership of the fuzzy inputs being evaluated. Other implementations do exist, however. For example, a strength of a rule may be calculated as the sum of the degrees of membership of each of its antecedents; Similarly, the degrees of membership may be multiplied or manipulated in any type of calculation to determine a rule strength.

In this implementation, the strength of the rule is only as strong as the weakest component. The weakest degree of membership value is used to determine a rule strength value of each of the actions specified in the "then" portion of the rule. In the rule shown in form (4), a rule strength corresponding to a minimum of the Fuzzy Input 1 and Fuzzy Input 2 values is stored in a first and a second address location in internal memory 32 pointed to by the addresses of the Action X and Action Y values, respectively. Each of the rule strengths corresponding to a predetermined one of the plurality of action values is used to provide a fuzzy output value which corresponds to a respective action. The fuzzy output value may then be defuzzified to perform an operation specified by the user. Although only two fuzzy input values and two action values are provided in form (4), either more or less values may be provided. The user of data processing system 10 determines the form of the rules and may provide any number of fuzzy inputs or actions to be performed.

Additionally, when more than one rule is to be evaluated, a possibility exists for an action to be assigned more than one rule strength. In such a situation, the rule strength with a greater value should be assigned to the action. Therefore, the action is assigned a rule strength of greatest value.

In the implementation of the invention described herein, internal memory 32 is generally used for memory storage. However, other memory circuits (not shown) external to data processing system 10 may also be used. Implementation and use of such external memory circuits is well known in the data processing art and should be apparent to one of ordinary skill. In this implementation, each of the fuzzy inputs is stored in internal memory 32 in the form:

| Memory Address | Fuzzy Inputs | Comment |
| --- | --- | --- |
| $1000 | $00 | Tcold |
| $1001 | $33 | Tcool |
| $1002 | $CC | Twarm |
| $1003 | $00 | Thot |
| $1004 | $00 | Plight |
| $1005 | $FF | Pmedium |
| $1006 | $00 | Pheavy |

As illustrated in Array 1, for the two system inputs, temperature and pressure, a degree of membership denoted as a "Fuzzy Input" is provided for each membership set for each system input. As was previously described with reference to FIG. 1, a first system input is a temperature of 58 degrees Fahrenheit. The temperature of 58 degrees Fahrenheit was fuzzified to have a degree of membership of $00 in the cold and hot membership sets, a degree of membership of $33 in the cool membership set, and a degree of membership of $CC in the warm membership set. As shown in Array 1, the values of both the $T_{cold}$ and $T_{hot}$ variables are $00, which indicates that the first system input is not in either of those two membership sets. However, the first system input has a $T_{cool}$ with a value of $33 and a $T_{warm}$ with a value of $CC. Therefore, the first input does have a degree of membership of $33 in the cool membership set and a degree of membership of $CC in the warm membership set.

Similarly, a second input is fuzzified to indicate a degree of membership of $00 in both the light and heavy pressure membership sets. Therefore, the values of both the $P_{light}$ and $P_{heavy}$ variables are $00, which indicates that the second input is not included in either of those two membership sets. However, the second input does have a degree of membership of $FF in the moderate membership set. Therefore, the $P_{medium}$ variable has a value of $FF.

Figure 5:
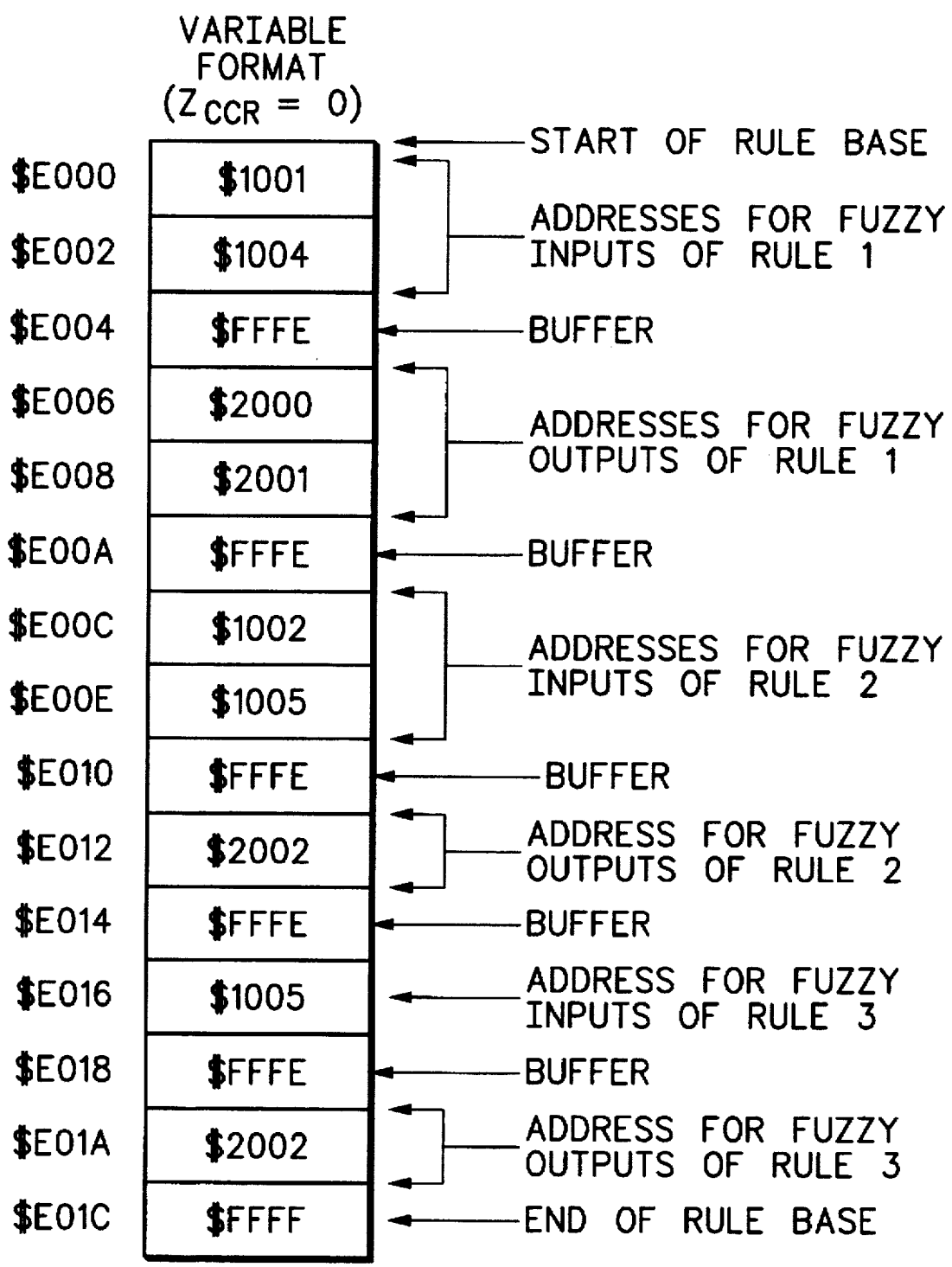
FIG. 5 illustrates in memory map form an array of rules to be evaluated in an internal memory of FIG. 2 in a variable format.

Like the fuzzy inputs, each of the rules to be evaluated (Rule 1 through Rule 3) is also stored in a rule array in internal memory 32. One such rule array is illustrated in FIG. 5 in a variable format. For each rule, address locations for both the fuzzy inputs and the fuzzy outputs are provided. The addresses of the fuzzy inputs and fuzzy outputs are stored in the form of FIG. 5 and reference a table of data values such as that previously shown in Array 1. Like the fuzzy inputs, the table of data values corresponding to the fuzzy outputs is also provided in an array which is not shown in detail herein.

A start of the rule array is located at a predetermined address specified by a user of data processing system 10. In the example described herein and illustrated in FIG. 5, the predetermined address is equal to $E000 and is stored in the index register prior to execution of the REV instruction. An address of a first one of the fuzzy inputs for a Rule 1 is located at hexadecimal address $E000, the start of the rule base. In this example, $T_{cool}$ is the first fuzzy input for Rule 1 and an address of $1001 is stored at address $E000 of the rule array. Because the $P_{light}$ value is the second fuzzy input of Rule 1, an address of $1004 is stored in the rule array at address $E002.

With respect to a variable format rule base, to separate the fuzzy inputs from the fuzzy outputs, a buffer with a value of $FFFE is stored in the rule array at address $E004. Subsequently, the fuzzy outputs of Rule 1 are separated from the fuzzy inputs of Rule 2 by a buffer with a value of $FFFE. This format, in which any number of fuzzy inputs is separated from any number of fuzzy outputs, by a buffer with a value of $FFFE is repeated until each of the fuzzy inputs and outputs of the plurality of rules is stored in memory. At that point, a special buffer value indicates the end of the rule base. In the example described herein, the end of the rule base is denoted by a value of $FFFF. Although the same buffer value is used to separate the fuzzy inputs from the fuzzy outputs of each rule, any number of buffers may be used by the designer of data processing system 10.

By placing each of the fuzzy inputs and outputs for each of the rules in such an order, each of the rules may be evaluated sequentially by using the buffer addresses as an indicator of a division between each of the fuzzy input and output sections. Therefore, the rules do not have to follow a fixed format with a specific number of fuzzy inputs and fuzzy outputs (actions). This allows for greater flexibility in providing rules for the fuzzy system. As may be seen in Rule 1, Rule 2, and Rule 3[(1), (2), and (3)], the number of fuzzy inputs and corresponding actions may vary from rule to rule in this implementation of the invention.

Figure 7:
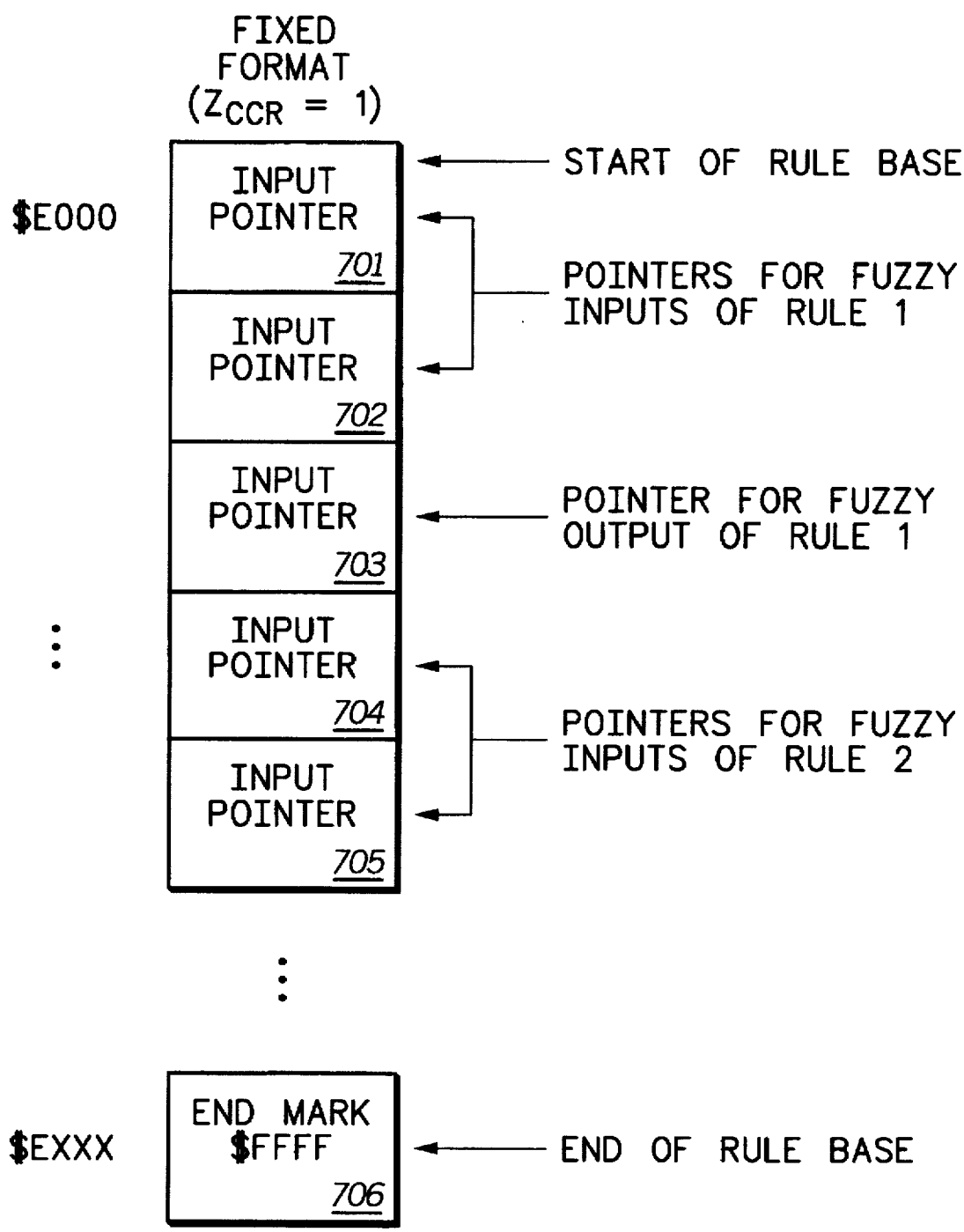
FIG. 7 illustrates in memory map form an array of rules to be evaluated in an internal memory of FIG. 2 in a fixed format.

In contrast, refer next to FIG. 7, which illustrates a memory rule array in a fixed format of two inputs and one output. Please note that the fixed format may be implemented with any predetermined number of fuzzy inputs and fuzzy output address pointers. In this case, two inputs 701 and 702 are implemented, then one output 703, then two inputs 704 and 705, etc. with the fixed format rule base ending with end mark 706 as similarly implemented in the variable format rule array illustrated in FIG. 5. Supporting a particular fixed format rule base has merit in addition to providing for execution and memory efficiency. First, all rule bases can be represented with the fixed format. Second, control surfaces of a fixed format rule base can be visualized; for example, a two-input, one-output rule base can be visualized with a three-dimensional plot. Third, complex systems can be decomposed into two-input, one-output subsystems to avoid combinatorial explosion of the rule matrix.

To provide a programmer, user, or a system the option of selecting between a fixed or variable format rule base, a switch mechanism is incorporated and implemented as a microcode branch based on the state of a condition code bit (Zbit) implemented within condition code register 60 illustrated in FIG. 3. In one implementation of the present invention, the Zbit (Z (zero) condition code bit) is used to signal the microcode to use a fixed or variable format rule base, because the Zbit is not needed for its usual purpose during execution of the rule evaluation instruction.

Figure 8:
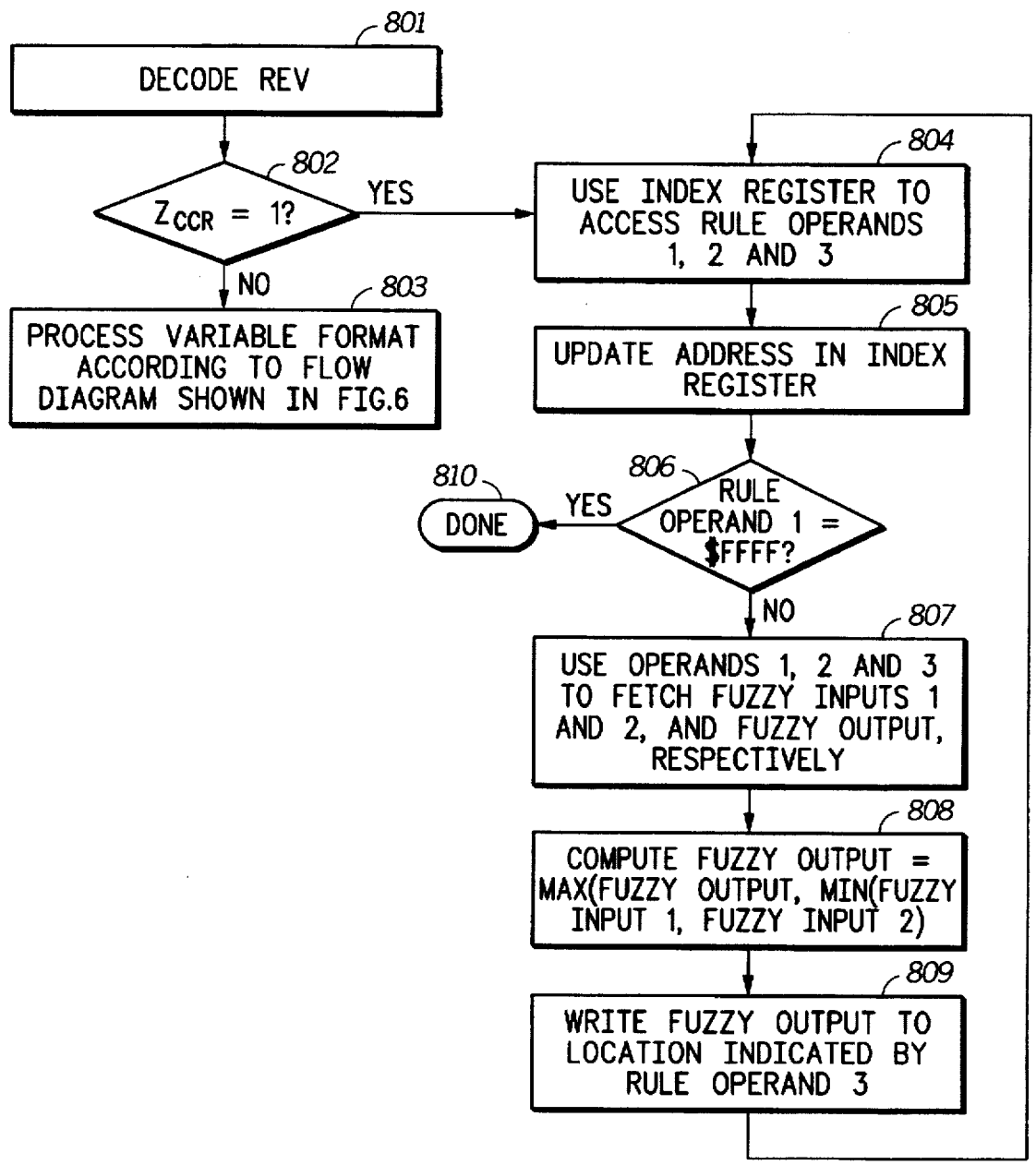
FIG. 8 illustrates in flow chart form a flow of functions performed during execution of a Rule Evaluation (REV) instruction in accordance with the invention described herein.

Referring next to FIG. 8, there is illustrated a flow diagram describing this switch mechanism and the implementation of a fixed format rule base. The process begins with step 801 wherein the REV instruction is decoded. Next, in step 802, a determination is made whether or not a predetermination has been made that a variable format rule base or a fixed format rule base is to be implemented. This is done with a microcode branch instruction that determines if a Zbit ($Z_{CCR}$) is equal to 0 or 1. The Zbit may be located within condition code register 60.

Figure 6:
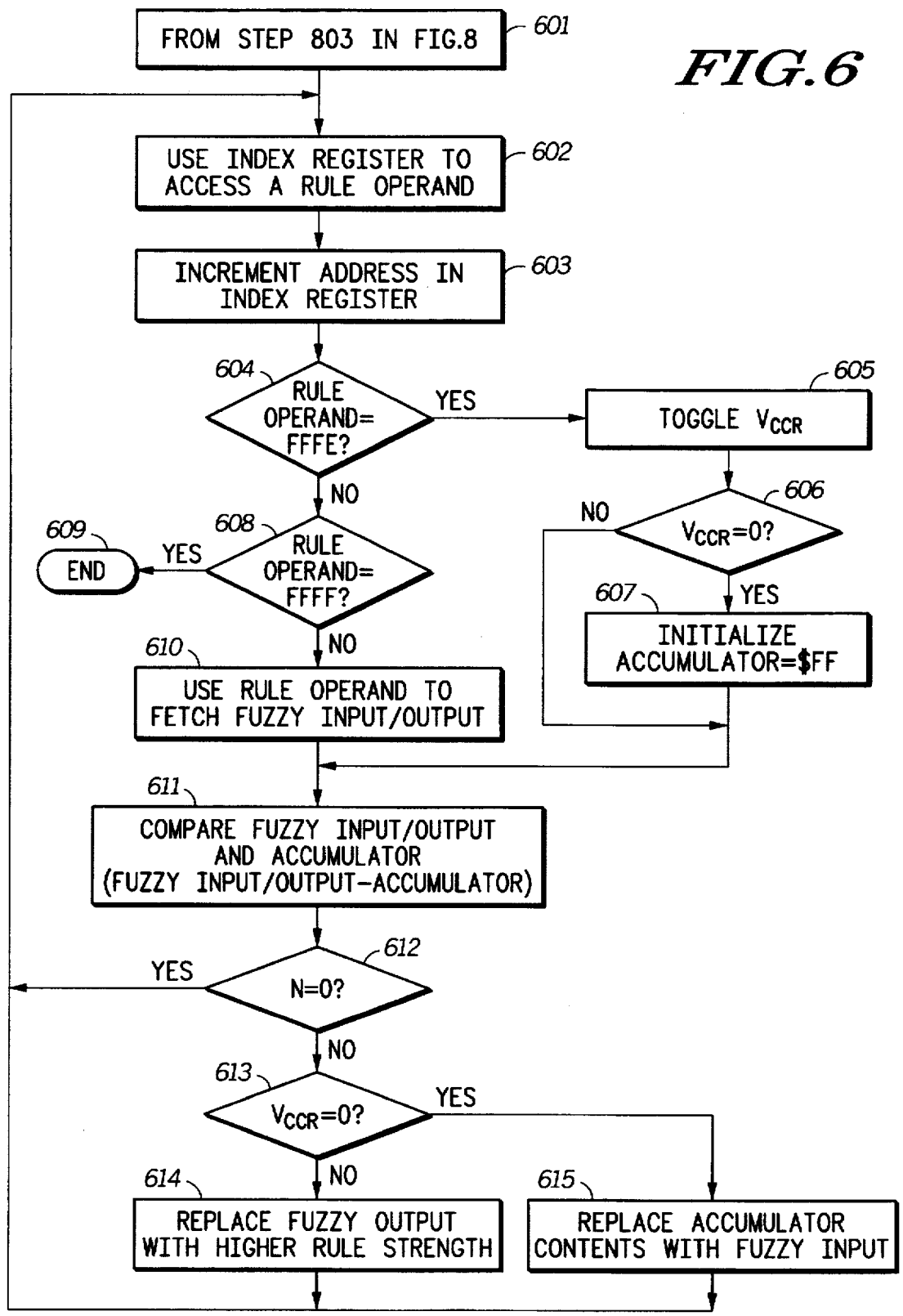
FIG. 6 illustrates in flow chart form a flow of functions performed during execution of the REV instruction in accordance with a variable format.

If this Zbit is equal to 0, the process will proceed to step 803 to process the fuzzy logic operation using the variable format rule base according to the flow diagram shown in FIG. 6.

If the Zbit is equal to 1, the process will proceed to steps 804–810 (discussed in further detail below) to implement the fuzzy logic operation with a fixed format rule base such as the one illustrated in FIG. 7. Steps 804–810 illustrate a fixed format being of a two-input one-output structure. However, as noted above, the fixed format may be programmed to have any predetermined number of fuzzy inputs and fuzzy outputs.

Operation of steps 804–810 is similar to those steps illustrated in FIG. 6, except that there is no need to evaluate whether or not the various $FFFE buffers have been encountered.

To begin execution of the REV instruction, each of the fuzzy inputs and outputs of the rules are stored in memory in the rule array having one of the predetermined formats illustrated in FIGS. 5 and 7. Additionally, the starting address of the rule array is stored in the index register in execution unit 14 and each of the fuzzy outputs is assigned a hexadecimal value of $00. Finally, to prepare for processing of a variable format rule base, accumulator 58 is initialized with $FF which forces $Z_{CCR}$=0 (variable format rule base) and $V_{CCR}$=0 (a pre-condition required for proper operation of steps 606 and 613 in FIG. 6). Alternatively, to prepare for processing of a fixed format rule base, accumulator 58 may be initialized with $00 which forces $Z_{CCR}$=1 (fixed format rule base). Execution of the REV instruction may then be performed in accordance with one of the rule base formats illustrated in FIGS. 6 and 8. The flow charts will provide a brief overview of each of the functions performed during execution of the REV instruction for either the variable or fixed format rule base. A more detailed explanation of each of the functions will follow during a course of an example of execution of the REV instruction.

As illustrated in FIG. 8, a first step in execution of the REV instruction is performed when the REV instruction is decoded.

If the process proceeds to step 803, then the process in FIG. 6 is followed (step 601). The address stored in the index register, herein referred to as "X", is then used to fetch a first rule operand (step 602). Address X is then incremented to point at a next address location (X+2) (step 603).

The value of the first rule operand is then tested to determine whether or not the value equals hexadecimal $FFFE (step 604). If the value equals hexadecimal $FFFE, the $V_{CCR}$ signal is toggled to indicate that a buffer value was retrieved (step 605). If the $V_{CCR}$ signal is equal to zero after being toggled (step 606), a first fuzzy input of a rule is to be evaluated and accumulator 58 should be initialized to a hexadecimal value of $FF (step 607). Otherwise, the value of accumulator 58 is not modified.

If the value of the first rule operand is not equal to $FFFE (step 604), the value is tested to determine whether or not it equals hexadecimal $FFFF (step 608). If the value equals hexadecimal $FFFF, an end of the rule array has been accessed and the REV instruction is terminated (step 609).

If the value of the first rule operand is not equal to $FFFF, however, the value of the first rule operand is used to access a fuzzy input or output value from internal memory 32 (step 610). The contents of accumulator 58 are then subtracted from the fuzzy input or output value to provide a signed result (step 611). The sign of the result is indicated by a value of the N signal.

If the N signal is equal to zero (step 612), then the contents of both accumulator 58 and data 40 should not be swapped and the address stored in the index register accesses a next rule operand (step 602). However, if the N signal is equal to one, the $V_{CCR}$ signal is tested (step 613).

If the $V_{CCR}$ signal is equal to zero, the contents of accumulator 58 should be replaced with the value of the fuzzy input value accessed by the first rule operand (step 615). (Step 614 refers to the portion of the process when $V_{CCR}$ is asserted indicating an evaluation of the fuzzy outputs, as described in more detail below.) Therefore, a minimum function is used to determine a rule strength which will be assigned to the fuzzy outputs of the rule currently being evaluated. Next, the address stored in the index register is used to access a next rule operand (step 602).

The flow chart illustrated in FIG. 6 provides an overview of execution of the REV instruction in data processing system 10 when a variable format rule base is to be implemented. As noted above, and as further described below, implementation of the fixed format rule base in accordance with the flow chart illustrated in FIG. 8 is similar to implementation of the variable format rule base with one of the primary differences being that the buffers implemented to separate fuzzy inputs and outputs are not needed.

A more detailed example of the present invention will now be given.

The fundamental operation of the REV instruction is as follows: each of the antecedent values is retrieved from memory and a minimum antecedent value is determined, then each of the consequence values is retrieved, compared to the rule strength value and replaced in memory with that rule strength value if and only if the pre-existing consequence value is less than the rule strength value.

As was previously described, the plurality of fuzzy inputs is stored in a first predetermined memory location in internal memory 32 by the user of data processing system 10 prior to execution of the REV instruction. This is true whether the fixed format or the variable format rule base is implemented. The plurality of fuzzy inputs is stored in accordance with Array 1. Additionally, each of the rules for evaluating the plurality of fuzzy inputs is also stored in a second predetermined memory location in internal memory 32 in one of the forms illustrated in FIGS. 5 and 7. Although not shown in detail herein, each of the rule strength values corresponding to the fuzzy outputs is also stored in internal memory 32 at a starting address of $2000 in an array similar to Array 1. The user of data processing system 10 will assign all of the values of the fuzzy outputs a hexadecimal value of $00 prior to execution of the REV instruction. Additionally, the user of data processing system 10 will initialize accumulator 58 to a hexadecimal value of $FF for variable rule bases or $00 for fixed rule bases prior to execution of the REV instruction. As was previously stated, when accumulator 58 is initialized to $FF indicating a variable format rule base, the $V_{CCR}$ signal is negated and the $Z_{CCR}$ signal is negated. When a fixed rule base is used, accumulator 58 is initialized to $00 which asserts the $Z_{CCR}$ signal (the value of $V_{CCR}$ is "don't care" for fixed rule bases).

During operation, a user may provide the REV instruction to data processing system 10 through a software program stored either externally or in internal memory 32. Should the REV instruction be provided by a source external to data processing system 10, the REV instruction would be input via external data bus 33 to external bus interface 30. External bus interface 30 would subsequently provide the REV instruction to CPU 12 via internal data bus 34. If the REV instruction was provided by a software program in internal memory 32, the REV instruction would be provided to CPU 12 via internal data bus 34. In CPU 12, execution unit 14 would provide the REV instruction to instruction decode logic circuit 18 in response to control signals received from each of bus control logic circuit 16, control unit 20, and sequencer 22. Additionally, each of the components of CPU 12 receive timing control signals via Timing Control bus 38. Routing and use of such timing control signals are well known in the data processing art and, as such, will not be discussed in detail herein.

Instruction decode logic circuit 18 decodes the REV instruction to provide a plurality of control and information signals necessary for the proper execution of the REV instruction. Upon receipt and decoding of the REV instruction, execution unit 14 begins the steps necessary to evaluate a plurality of fuzzy inputs stored in internal memory 32. Control unit 20 and sequencer 22 of CPU 12 in FIG. 2 collectively provide a series of sequencing control signals necessary to transfer pointers to the addresses of both the fuzzy inputs and the fuzzy outputs from internal memory 32 to execution unit 14.

To begin execution of the REV instruction, the index register (not shown) in execution unit 14 provides a pointer to the start of the rule base. Index registers and their use in data processing systems are commonly known in the data processing art and, therefore, are not explained in detail herein. The pointer points to a starting address of the rule base in internal memory 32 where a degree of membership of the first input in the cool temperature membership set is stored. The address indicates an address where the first fuzzy input value of Rule 1 is stored. In the example described herein with respect to FIGS. 5 and 7, hexadecimal address $1001 or the first input pointer is stored at address $E000 in internal memory 32.

In the case of the variable format rule base described in FIG. 6, when the address of the first fuzzy input value of Rule 1 is accessed from the rule array, the address is provided to data buffer 40 via External Information bus 41. Data buffer 40 subsequently provides the address value to comparator 72 where the address value is compared to a hexadecimal value of $FFFE. If the address value is equal to $FFFE, a buffer address is pointed to and the $V_{CCR}$ bit should be toggled. Traditionally, the $V_{CCR}$ bit is used to indicate an overflow error in a signed arithmetic calculation. However, in this implementation of the invention, the overflow bit ($V_{CCR}$) in a condition code register is set to indicate whether the accessed address corresponds to either a fuzzy input address, a buffer address, or a fuzzy output address. When an address corresponding to the fuzzy inputs of a first rule is accessed, the $V_{CCR}$ bit remains negated. If the accessed address accessed is a buffer value, the $V_{CCR}$ bit is toggled. In the example described herein, the buffer value is equal to a hexadecimal value of $FFFE. Additionally, when the addresses of the fuzzy outputs are accessed, the $V_{CCR}$ bit remains asserted.

When the address value equals $FFFE, comparator 72 asserts the Toggle signal. Condition code logic circuit 47 receives the Toggle signal and subsequently provides an asserted Condition Code signal to condition code register 60. In turn, condition code register 60 either asserts or negates the $V_{CCR}$ signal accordingly.

In the example described herein, an address value of $1001 is accessed from address $E000, the address of the first fuzzy input value of Rule 1 in the rule array. Because $1001 does not equal $FFFE, comparator 72 does not assert the Toggle signal. Therefore, the Condition Code signal provided by condition code logic circuit 47 does not enable condition code register 60 to toggle the $V_{CCR}$ signal.

In the next step (step 608), comparator 72 compares the address value of the first fuzzy input of Rule 1 with a hexadecimal value of $FFFF. If the address value is equal to $FFFF, an end of rule array address is pointed to and execution of the REV instruction is terminated (step 609).

At this point, the following discussion will be in reference to the implementation of a variable format rule base in accordance with FIGS. 5 and 6. After the discussion of the implementation of the fuzzy logic system with a variable format rule base, a discussion will be provided below for an implementation of a fixed format rule base as illustrated with respect to FIGS. 7 and 8.

When address $1001 is accessed from internal memory 32, a degree of membership of the first system input in the cool temperature membership set is provided. As shown in Array 1, the degree of membership is equal to a hexadecimal value of $-33. Internal memory 32 provides the information to data buffer 40 of execution unit 14 via Internal Data bus 34. External Information bus 41 provides information transferred via both Internal Address bus 36 and Internal Data bus 34.

The first fuzzy input ($33) is stored in data buffer 40 for subsequent processing. To determine a minimum degree of membership of the antecedents of Rule 1, the current contents of accumulator 58 ($FF) are subtracted from the first fuzzy input ($33). To perform this function, the contents of accumulator 58 are provided to Information Bus A 66 and the contents of data buffer 40 are provided to Information Bus B 64. Additionally, a plurality of control and timing signals are provided to execution unit 14 via Micro-ROM control bus 65. The plurality of control and timing signals is provided as a result of decoding the REV instruction by instruction decode logic 18 of FIG. 2.

In execution unit 14, the first fuzzy input is provided to A-input multiplexor 50 and the contents of accumulator 58 are provided to B-input multiplexor 56 at a point in time determined in accordance with the timing signals transferred via Micro-ROM Control bus 65. B-input control circuit 54 provides a "Control B" signal to control operation of B-input multiplexor 56. In this example, the Control B signal allows B-input multiplexor 46 to pass an unmodified first fuzzy input value to ALU 52. Similarly, A-input control circuit 54 provides a "Control A" signal to A-input multiplexor 50. The Control A signal allows A-input multiplexor 50 to negate the contents of accumulator 58 such that the contents may be subtracted from the first fuzzy input in ALU 52.

Upon receipt of the first fuzzy input value and a negated accumulator content value, ALU 52 subtracts the contents of accumulator 58 ($FF) from the first fuzzy input ($33) to provide a result. The result is a negative number ($33−$FF= −$CC) and the N signal is asserted. The asserted N signal is transferred via Results bus 120. If the result had been positive, the N flag would not have been set and a negated N signal would have been provided via Results bus 120. The numerical result of the subtraction operation is not required and is, therefore, written over during subsequent arithmetic operations.

Register swap logic 46 allows the user to determine a minimum degree of membership in each of the fuzzy inputs of a rule and to subsequently use that minimum degree of membership as a rule strength for each of the actions specified by the rule. During operation, register swap logic 46 may or may not switch the contents of accumulator 58 and data buffer 40 depending on values of the $V_{CCR}$ and N signals.

Register swap logic 46 receives the $V_{CCR}$ signal, N signal, and a Timing Control signal to control switching of the contents of accumulator 58 and data buffer 40. As was previously mentioned, when a fuzzy input value is provided to execution unit 14 from internal memory 32, the $V_{CCR}$ signal remains negated. Additionally, ALU 52 provides the N signal to indicate whether a result of a subtraction of the contents of accumulator 58 from the contents of data buffer 40 is positive or negative. If the contents of accumulator 58 are greater than the first fuzzy input which is stored in data buffer 40, the N signal is asserted to indicate a negative result. Conversely, if the first fuzzy input is less than the contents of accumulator 58, the N signal remains negated to indicate a positive result. At an appropriate time determined by timing circuit 28, the Timing Control signal is asserted to enable register swap logic circuit 46 to either transfer the contents of accumulator 58 to data buffer 40, to transfer the contents of data buffer 40 to accumulator 58, or to let the contents of both accumulator 58 and data buffer 40 remain the same.

During evaluation of the "if" portion of Rule 1, when the contents of accumulator 58 are subtracted from the first fuzzy input, a negative result is generated ($33−$FF=− $CC). Therefore, the N signal remains asserted. Additionally, the $V_{CCR}$ signal is negated to indicate that a fuzzy input is being retrieved from internal memory 32. When the Timing Control signal is asserted, an output of AND gate 62 is equal to zero and the Enable A signal is not asserted. However, the output of inverter 68 is asserted and AND gate 70 is enabled to assert the Enable B signal. When the Enable B signal is asserted, selector 44 is enabled to transfer data from data buffer 40 to accumulator 58. The minimum degree of membership is, at this point, $33, and is stored in accumulator 58.

Similarly, the second fuzzy input of Rule 1 is provided to data buffer 40. The second fuzzy input is the degree of membership the second system input has in the light pressure ($P_{light}$) membership set. In this example, the degree of membership has a hexadecimal value of $00. Again, internal memory 32 provides the degree of membership of the second fuzzy input to data buffer 40 of execution unit 14 via External Information bus 41.

To determine a minimum degree of membership, the first fuzzy input is subtracted from the second fuzzy input. In execution unit 14, the first fuzzy input is provided to A-input multiplexor 50 and the second fuzzy input is provided to B-input multiplexor 56 at a point in time determined in accordance with the timing signals transferred via Micro-ROM Control bus 65. B-input control circuit 54 provides a "Control B" signal to control operation of B-input multiplexor 56. In this example, the Control B signal allows B-input multiplexor 46 to pass an unmodified second fuzzy value to ALU 52. Similarly, A-input control circuit 54 provides a "Control A" signal to A-input multiplexor 50. The Control A signal allows A-input multiplexor 50 to negate the first fuzzy input such that it may be subtracted from the second fuzzy input in ALU 52.

Upon receipt of the second fuzzy input value and a negated first fuzzy input value, ALU 52 subtracts the first fuzzy input value from the second to again provide a negative result. Therefore, the N signal is asserted. Additionally, the $V_{CCR}$ signal is negated to indicate that a fuzzy input is being retrieved from internal memory 32.

When the Timing Control signal is asserted, an output of AND gate 62 is equal to zero and the Enable A signal is not asserted. In this first example, AND gate 70 does assert the Enable B signal. When the Enable B signal is asserted, selector 44 is enabled to transfer data from data buffer 40 to accumulator 58. Therefore, the minimum degree of membership is, at this point, $00, and is stored in accumulator 58.

At the end of the memory locations of the fuzzy inputs for Rule 1, a buffer address is recognized by comparator 72. Comparator 72 provides an asserted Toggle signal to condition code logic circuit 47. Condition code logic circuit 47 then provides the Condition Code signal to condition code register such that the V bit in condition code register 60 is toggled to provide an asserted $V_{CCR}$ signal. As was previously explained, the $V_{CCR}$ signal is asserted to indicate that an address of a fuzzy output of Rule 1 is the next address to be retrieved from internal memory 32. In the example described herein, the $V_{CCR}$ signal is asserted during execution of the "then" portion of the REV instruction when the addresses of the fuzzy outputs for Rule 1 are retrieved from internal memory 32.

When one of a plurality of fuzzy outputs is chosen, a maximum operation is performed. Therefore, for the "then" portion of the REV instruction, a maximum rule strength is assigned to each fuzzy output. As was previously explained, a maximum rule strength should be assigned for each fuzzy output. Therefore, the minimum degree of membership value stored in accumulator 58 as a result of execution of the "if" portion of the REV instruction is compared to a rule strength value currently stored at the fuzzy output address in internal memory 32. The current rule strength value resides stored in accumulator 58 during execution of the "then" part of the REV instruction. The maximum rule strength value is always stored in internal memory 32. As was previously discussed, the minimum degree of membership value was calculated in a first part of the REV instruction where degrees of membership of each of the fuzzy inputs are compared to determine a minimum value.

The minimum value of the fuzzy inputs remains in accumulator 58. The address pointers to fuzzy outputs of the rule currently being evaluated are then provided from the rule array. The index register (not shown) in execution unit 14 increments the pointer to point to an address of the first fuzzy output. In this example, the pointer is incremented to address $E006. At address $E006, an address of the first fuzzy output, hexadecimal address $2000, is provided. Because the user of data processing system 10 assigns all data values stored in the fuzzy output array a hexadecimal value of $00 prior to execution of the REV instruction, internal memory 32 provides a hexadecimal value of $00 when address $2000 is accessed. The value of the fuzzy output ($00) is then provided to data buffer 40 via External Information bus 41 where the fuzzy output value is stored for subsequent operations.

To determine a maximum rule strength value, the contents of accumulator 58 are subtracted from data buffer 40 to determine which has a greater value. In other words, the minimum degree of membership value calculated during the "if" portion of the rule evaluation step is subtracted from the rule strength value currently stored in the address location of the first fuzzy output of Rule 1. To perform this function, the contents of accumulator 58 are provided to Information Bus A 66 and the contents of data buffer 40 are provided to Information Bus B 64. Additionally, a plurality of control and timing signals are provided to execution unit 14 via Micro-ROM control bus 65. The plurality of control and timing signals is provided as a result of decoding the REV instruction by instruction decode logic 18 of FIG. 2.

In execution unit 14, the minimum degree of membership value stored in accumulator 58 is provided to A-Input multiplexor 50 and current fuzzy output value stored in data buffer 40 is provided to B-Input multiplexor 56 at a point in time determined in accordance with the timing signals transferred via Micro-ROM Control Bus 65. B-Input control circuit 54 provides the Control B signal to control operation of B-Input multiplexor 56. In this example, the Control B signal allows B-Input multiplexor to pass an unmodified fuzzy output value from internal memory 32 to ALU 52. Similarly, A-Input control circuit 48 provides the Control A signal to A-Input multiplexor 40. The Control A signal enables A-Input multiplexor 50 to negate the contents of accumulator 58 for a subsequent subtraction operation in ALU 52.

Upon receipt of the values from both A-Input multiplexor 50 and B-Input multiplexor 56, ALU 52 subtracts the minimum degree of membership value stored in accumulator 58 from the fuzzy output value stored at a predetermined memory location corresponding to the first fuzzy output of Rule 1. In the example described herein, the value stored in accumulator 58 has a hexadecimal value of $00. Because each of the fuzzy outputs of Rule 1 is assigned a hexadecimal value of $00, the result provided by ALU 52 is $00. Because the answer is not a negative number, the N signal remains negated and is subsequently provided to register swap logic 46.

As was previously discussed, condition code register 60 provides the $V_{CCR}$ signal to register swap logic 46. Additionally, the Timing Control signal is provided by an external source, timing circuit 28, to register swap logic 46. Upon receipt of each of the $V_{CCR}$, N, and Timing Control signals, register swap logic 46 negates both the Enable A and Enable B signals. Therefore, selectors 42 and 44 are respectively not enabled and do not allow a transfer of data between data buffer 40 and accumulator 58. Accordingly, the rule strength of the first fuzzy output in internal memory 32 is not modified and continues to have a hexadecimal value of $00.

Similarly, during determination of a rule strength for the second fuzzy output of Rule 1, both the value stored in accumulator 58 and the rule strength value retrieved from internal memory 32 have a hexadecimal value of $00. Therefore, ALU 52 again negates the N signal and register swap logic 46 is subsequently enabled to negate both the Enable A and Enable B signals. Therefore, after evaluation of Rule 1, the rule strength of each of the specified fuzzy outputs, Action 1 and Action 2, has a hexadecimal value of $00.

Again, at the end of the memory locations of the fuzzy outputs for Rule 1, a buffer address is recognized by comparator 72. Comparator 72 provides an asserted Toggle signal to condition code logic circuit 47. Condition code logic circuit 47 provides the Condition Code signal to condition code register such that the V bit in condition code register 60 is toggled to provide a negated $V_{CCR}$ signal. As was previously explained, the $V_{CCR}$ signal is negated to indicate that an address of a fuzzy input of Rule 2 is the next address to be retrieved from internal memory 32. In the example described herein, the $V_{CCR}$ signal is negated during execution of the "if" portion of the REV instruction when the addresses of the fuzzy inputs for Rule 2 are retrieved from internal memory 32. When the $V_{CCR}$ signal is negated, the contents of accumulator 58 are again initialized to a value of $FF.

Continuing execution of the REV instruction requires evaluation of Rule 2. As was previously explained, control unit 20 provides a series of sequencing control signals necessary to transfer each of the fuzzy inputs of Rule 2 from internal memory 32 to execution unit 14. During evaluation of Rule 2, internal memory 32 provides a first address where a degree of membership of the first system input in the warm temperature membership set is stored therein. In the example described herein, the address would point to hexadecimal address $1002 in internal memory 32. When address $1002 is accessed from internal memory 32, a degree of membership with a hexadecimal value of $CC is provided to data buffer 40 via Internal Data bus 34.

As during evaluation of Rule 1, the first fuzzy input of Rule 2 is compared to the initialized contents of accumulator 58. Accumulator 58 is again initialized to a hexadecimal value of $FF when the second buffer address was recognized. Therefore, the minimum value is detected in accordance with the method previously described and a $CC is stored in accumulator 58.

Similarly, the second fuzzy input of Rule 2 is provided to data buffer 40. The second fuzzy input is the degree of membership the second system input has in the medium pressure membership set. In this example, the degree of membership has a hexadecimal value of $FF.

To determine a minimum degree of membership, ALU 52 subtracts the first fuzzy input from the second fuzzy input to provide a result of a positive $33. Because the result is positive, the N flag is cleared and a negated N signal is provided via Results bus 120.

Subsequently, register swap logic 46 receives the $V_{CCR}$ signal, N signal, and the Timing Control signal to control switching of the contents of accumulator 58 and data buffer 40. Register swap logic 46 negates both the Enable A and Enable B signals. the minimum degree of membership, a hexadecimal value of $CC, remains stored in accumulator 58.

At the end of the memory locations of the fuzzy inputs for Rule 2, a buffer address is recognized by comparator 72. Comparator 72 provides an asserted Toggle signal to condition code logic circuit 47. Condition code logic circuit 47 then provides the Condition Code signal to condition code register such that the V bit in condition code register 60 is toggled to provide an asserted $V_{CCR}$ signal. As was previously explained, the $V_{CCR}$ signal is negated to indicate that an address of a fuzzy output of Rule 2 is the next address to be retrieved from internal memory 32.

The minimum value of the fuzzy inputs of Rule 2 remains in accumulator 58. The fuzzy outputs of the rule currently being evaluated are then provided from the rule array. The index register in execution unit 14 increments the pointer to point to an address of the first fuzzy output. In this example, the pointer is incremented to address $E012. At address $E012, an address of the first fuzzy output, hexadecimal address $2002, is provided. Because the user of data processing system 10 assigns all data values stored in the fuzzy output array a hexadecimal value of $00 prior to execution of the REV instruction, internal memory 32 provides a hexadecimal value of $00 when address $2002 is accessed. The value of the fuzzy output ($00) is then provided to data buffer 40 via External Information bus 41 where the fuzzy output value is stored for subsequent operations.

ALU 52 then subtracts the hexadecimal value of $CC stored in accumulator 58 from the hexadecimal value of $00 stored in data buffer 40. A result is a negative $CC value and the N signal is asserted. When each of the N, $V_{CCR}$, and Timing signals are provided to register swap logic 46, register swap logic 46 asserts the Enable A signal and negates the Enable B signal.

When the Enable A signal is asserted, selector 42 is enabled to drive the contents of accumulator 58 to data buffer 40. Data buffer 40 temporarily stores the previous minimum degree of membership value ($CC) provided by accumulator 58 as a maximum rule strength value. Additionally, data buffer 40 transfers the maximum rule strength value to the address location ($2002) of the first fuzzy output of Rule 2. Therefore, a value of $CC is the current rule strength value of Action 3 at address $2002 in internal memory 32 at this point during execution of the REV instruction.

Again, at the end of the memory locations of the fuzzy outputs for Rule 2, a buffer address is recognized by comparator 72. Comparator 72 provides an asserted Toggle signal to condition code logic circuit 47. Condition code logic circuit 47 provides the Condition Code signal to condition code register such that the V bit in condition code register 60 is toggled to provide a negated $V_{CCR}$ signal. As was previously explained, the $V_{CCR}$ signal is negated to indicate that an address of a fuzzy input of Rule 3 is the next address to be retrieved from internal memory 32. In the example described herein, the $V_{CCR}$ signal is negated during execution of the "if" portion of the REV instruction when the addresses of the fuzzy inputs for Rule 3 are retrieved from internal memory 32. When the $V_{CCR}$ signal is negated, the contents of accumulator 58 are again initialized to a value of $FF.

Continuing execution of the REV instruction begins evaluating of Rule 3. As was previously explained, control unit 20 of CPU 12 provides a series of sequencing control signals necessary to transfer each of the fuzzy inputs of Rule 3 from internal memory 32 to execution unit 14. During evaluation of Rule 3, internal memory 32 provides a first address where a degree of membership of the second system input in the medium pressure membership set is stored therein. In the example described herein, the address would point to hexadecimal address $1005 in internal memory 32. When address $1005 is accessed from internal memory 32, a degree of membership with a hexadecimal value of $FF is provided to data buffer 40 via Internal Data bus 34.

As was previously mentioned, the contents of accumulator 58 are initialized to $FF when the $V_{CCR}$ signal is negated. When the degree of membership stored in data buffer 40 is subtracted from the contents of accumulator 58 by ALU 52, a result of zero is produced. Because the result is not negative, the N signal is not asserted. Therefore, register swap logic 56 does not assert either the Enable A or Enable B signals and information is not transferred between data buffer 40 and accumulator 58.

At the end of the memory location of the fuzzy input of Rule 3, a buffer address is recognized by comparator 72. Comparator 72 provides an asserted Toggle signal to condition code logic circuit 47. Condition code logic circuit 47 then provides the Condition Code signal to condition code register 60 such that the V bit in condition code register 60 is toggled to provide an asserted $V_{CCR}$ signal. As was previously explained, the $V_{CCR}$ signal is asserted to indicate that an address of a fuzzy output of Rule 3 is the next address to be retrieved from internal memory 32.

Subsequently, the address of the fuzzy output of Rule 3 is accessed from internal memory 32 and a hexadecimal value of $CC is provided to data buffer 40. The hexadecimal value of $CC is provided as a result of evaluation of Rule 2 in which the fuzzy output, Action 3, was assigned a rule strength value of hexadecimal $CC. Therefore, hexadecimal value $CC is provided to data buffer 40.

ALU 52 then subtracts the hexadecimal value of $FF stored in accumulator 58 from the hexadecimal value of $CC stored in data buffer 40. A result is a negative $-33 value. When provided to register swap logic 46, register swap logic 46 asserts the Enable A. Therefore, selector 42 is enabled to communicate data from accumulator 58 to data buffer 40. Data buffer 40 transfers the minimum degree of membership value to the address location of the fuzzy output of Rule 3, the Action 3 output. Therefore, a hexadecimal value of $FF is the current rule strength value of Action 3 at this point during execution of the REV instruction.

After evaluation of Rule 3, a special buffer address indicating an end of the array of rules to be evaluated is detected by comparator 72 and the REV instruction is terminated. At that point, each of Rules 1, 2, and 3 has been evaluated and each of the corresponding fuzzy outputs has been assigned a rule strength value. In the example described herein, each of Actions 1 and 2 has been assigned a rule strength value of hexadecimal $00. Additionally, Action 3 has been assigned a rule strength value of hexadecimal $FF. Each of the Actions is then provided as a fuzzy output to a defuzzification routine to be used to determine appropriate actions for data processing system 10. For example, Action 3 may be defuzzified to open a valve or to turn on a fan. Additionally, the rule strength of Actions 1 through 3 may be defuzzified to determine a degree to which a fan is turned on or a valve is opened. The defuzzification operation is well known in the data processing art and, therefore, is not explained in detail herein.

Therefore, during execution of the REV instruction in data processing system 10, each of Rule 1, Rule 2, and Rule 3 were evaluated quickly and with a minor amount of added circuitry. Most of the circuitry shown in FIG. 3 is generally used to perform general purpose processing in a data processor. A small amount of additional memory in the Micro-ROM and a small amount of added instruction decode logic is required to implement the present invention. Additionally, in execution unit 14, comparator 72 and register switch logic circuit 46 are required in addition to logic traditionally required.

With respect to FIG. 8, in step 804, the index register is used to access the first three rule operands, or pointers (701,702, 703), to then access the two fuzzy inputs and the fuzzy output stored in internal memory 32. In step 805, the address in the index register is then updated. In step 806, comparator 72 compares the address value of the first fuzzy input of Rule 1 with a hexadecimal value of $FFFF. If the address value is equal to $FFFF, an end of rule array address is pointed to and execution of the REV instruction is terminated (step 810).

Steps 807–809 illustrated in FIG. 8 do not require the implementation of the $V_{CCR}$ bit and the processing related thereto. However, the implementation of the fixed format rule base does utilize the hardware illustrated in FIGS. 1–3 in a similar manner. After step 806, if the end mark 706 has not been reached, the process proceeds to step 807 wherein the rule operands 1, 2 and 3 are utilized to fetch the two fuzzy inputs 1 and 2 and the fuzzy output for a rule, respectively.

Thereafter, in step 808, one or more instructions are executed in order to compute the new fuzzy output. This may be done in a manner as similarly described above with FIG. 6. Essentially, the two fuzzy inputs are compared and the minimum value is then chosen. Then, this minimum value is compared with the retrieved fuzzy output value, and the maximum of these two is then chosen as the computed fuzzy output. Thereafter, in step 809, this new fuzzy output is written to the location indicated by rule operand 3. The process will then return to step 804 to continue the fuzzy logic operation for the next set of two fuzzy inputs and one fuzzy output.

The implementation of the invention described herein is provided by way of example only. However, many other implementations may exist for executing the function described herein. For example, the start of the rule base of the rules to be evaluated may be provided as an operand of the REV instruction. Additionally, a memory circuit external to data processing system 10 may be used to store each of the rules and the fuzzy inputs used during evaluation of the rules. As well, although the N and $V_{CCR}$ signals were used to control operation of register swap logic 46 in this implementation of the invention, other signals within data processing system 10 may be easily adapted for use. Additionally, the logic gates used in register swap logic 56 may also be replaced with other logic circuits such as NAND, OR, NOR, or Exclusive-OR gates.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

Although the present invention and its advantages have been described in detail, it should be understood that various changes, substitutions and alterations can be made herein without departing from the spirit and scope of the invention as defined by the appended claims.

We claim:

1. A method for operating a digital data processor to perform a fuzzy rule evaluation operation, said method comprising the steps of:

decoding a rule evaluation instruction;

determining if a fixed or variable format rule base is to be used with said rule evaluation instruction;

processing said rule evaluation instruction with said fixed format rule base if it is determined that said fixed format rule base is to be used with said rule evaluation instruction; and processing said rule evaluation instruction with said variable format rule base if it is determined that said variable format rule base is to be used with said rule evaluation instruction.

2. The method as recited in claim 1, wherein said step of processing said rule evaluation instruction with said fixed format rule base if it is determined that said fixed format rule base is to be used with said rule evaluation instruction further comprises the steps of:

1) retrieving address values from a predetermined number of memory locations;

2) comparing one of said address values to a boundary value and terminating said fuzzy rule evaluation operation if said one of said address values matches said boundary value;

3) if said fuzzy rule evaluation operation is not terminated, retrieving one or more fuzzy input values and one or more fuzzy output values from memory locations pointed to by said address values; and 4) computing a fuzzy output value using said one or more fuzzy input values and said one or more fuzzy output values.

3. The method as recited in claim 2, further comprising the steps of:

5) writing said fuzzy output value computed in step 4); and repeating steps 1)–5).

4. The method as recited in claim 2, wherein said memory locations are specified by a value contained in an index register, further comprising the step of:

incrementing said value contained in said index register.

5. The method as recited in claim 2, wherein said computing step further comprises the steps of:

determining a minimum of said fuzzy input values; and determining a maximum between said minimum of said fuzzy input values and said fuzzy output value retrieved in step 3).

6. The method as recited in claim 1, wherein said step of processing said rule evaluation instruction with said variable format rule base if it is determined that said variable format rule base is to be used with said rule evaluation instruction further comprises the steps of:

1) retrieving from a memory location an address value;

2) comparing the address value to a first boundary value and terminating the fuzzy rule evaluation operation if the address value matches the first boundary value;

3) comparing the address value to a second boundary value and changing a state of a first flag signal if the address value matches the second boundary value;

4) if the address value does not match either of the first and second boundary values and if the first flag signal is in a first state, retrieving from a memory location specified by the address value a membership function value and performing a first arithmetic operation using the membership function value;

5) if the address value does not match either of the first and second boundary values and if the first flag signal is in a second state, retrieving from a memory location specified by the address value a consequence value, performing a second arithmetic operation using the consequence value and selectively writing a result of the second arithmetic operation to the memory location specified by the address value; and 6) repeating steps 1)–5).

7. The method as recited in claim 6 wherein the step of performing a first arithmetic operation further comprises the steps of:

subtracting a value contained in a data register from the membership function value; and replacing the value contained in the data register with the membership function value if a result of the step of subtracting is negative.

8. The method as recited in claim 7 wherein the step of performing a second arithmetic operation further comprises the steps of:

subtracting the consequence value from the value contained in a data register; and replacing the consequence value stored at the memory location specified by the address value with the value contained in the data register if the result of the step of subtracting is positive.

9. A computer program product adaptable for storage in a data processing system, said computer program product operable for operating a digital data processor to perform a fuzzy rule evaluation operation, said computer program product comprising:

instruction means for decoding a rule evaluation instruction;

instruction means for determining if a fixed or variable format rule base is to be used with said rule evaluation instruction;

instruction means for processing said rule evaluation instruction with said fixed format rule base if it is determined that said fixed format rule base is to be used with said rule evaluation instruction; and instruction means for processing said rule evaluation instruction with said variable format rule base if it is determined that said variable format rule base is to be used with said rule evaluation instruction.

10. The computer program product as recited in claim 9, wherein said instruction means for processing said rule evaluation instruction with said fixed format rule base if it is determined that said fixed format rule base is to be used with said rule evaluation instruction further comprises:

instruction means for retrieving address values from a predetermined number of memory locations;

instruction means for comparing one of said address values to a boundary value and terminating said fuzzy rule evaluation operation if said one of said address values matches said boundary value;

instruction means for retrieving one or more fuzzy input values and one or more fuzzy output values from memory locations pointed to by said address values if said fuzzy rule evaluation operation is not terminated; and instruction means for computing a fuzzy output value using said one or more fuzzy input values and said one or more fuzzy output values.

11. The computer program product as recited in claim 10, wherein said computing instruction means further comprises:

instruction means for determining a minimum of said fuzzy input values; and instruction means for determining a maximum between said minimum of said fuzzy input values and said fuzzy output value.

12. The computer program product as recited in claim 9, wherein said instruction means for processing said rule evaluation instruction with said variable format rule base if it is determined that said variable format rule base is to be used with said rule evaluation instruction further comprises:

instruction means for retrieving from a memory location an address value;

instruction means for comparing the address value to a first boundary value and terminating the fuzzy rule evaluation operation if the address value matches the first boundary value;

instruction means for comparing the address value to a second boundary value and changing a state of a first flag signal if the address value matches the second boundary value;

instruction means for retrieving from a memory location specified by the address value a membership function value and performing a first arithmetic operation using the membership function value if the address value does not match either of the first and second boundary values and if the first flag signal is in a first state; and instruction means for retrieving from a memory location specified by the address value a consequence value, performing a second arithmetic operation using the consequence value and selectively writing a result of the second arithmetic operation to the memory location specified by the address value if the address value does not match either of the first and second boundary values and if the first flag signal is in a second state.

13. A digital data processor operable for performing a fuzzy rule evaluation operation, said processor comprising:

instruction decode logic operable for decoding a rule evaluation instruction; and an execution unit operable for:

determining if a fixed or variable format rule base is to be used with said rule evaluation instruction;

processing said rule evaluation instruction with said fixed format rule base if it is determined that said fixed format rule base is to be used with said rule evaluation instruction; and processing said rule evaluation instruction with said variable format rule base if it is determined that said variable format rule base is to be used with said rule evaluation instruction.

14. The processor as recited in claim 13, wherein said execution unit is operable for performing the following functions if it is determined that said fixed format rule base is to be used with said rule evaluation instruction:

1) retrieving address values from a predetermined number of memory locations in an internal memory coupled to said execution unit;

2) comparing one of said address values to a boundary value and terminating said fuzzy rule evaluation operation if said one of said address values matches said boundary value;

3) if said fuzzy rule evaluation operation is not terminated, retrieving one or more fuzzy input values and one or more fuzzy output values from memory locations in said internal memory pointed to by said address values; and 4) computing a fuzzy output value using said one or more fuzzy input values and said one or more fuzzy output values.

15. The processor as recited in claim 13, wherein said execution unit is operable for performing the following functions if it is determined that said variable format rule base is to be used with said rule evaluation instruction:

1) retrieving from a memory location in an internal memory coupled to said execution unit an address value;

2) comparing the address value to a first boundary value and terminating the fuzzy rule evaluation operation if the address value matches the first boundary value;

3) comparing the address value to a second boundary value and changing a state of a first flag signal if the address value matches the second boundary value;

4) if the address value does not match either of the first and second boundary values and if the first flag signal is in a first state, retrieving from a memory location in said internal memory specified by the address value a membership function value and performing a first arithmetic operation using the membership function value; and 5) if the address value does not match either of the first and second boundary values and if the first flag signal is in a second state, retrieving from a memory location in said internal memory specified by the address value a consequence value, performing a second arithmetic operation using the consequence value and selectively writing a result of the second arithmetic operation to the memory location specified by the address value.

* * * * *